United States Patent [19]
Aromin

[11] Patent Number: 6,052,266
[45] Date of Patent: *Apr. 18, 2000

[54] GROUND FAULT CIRCUIT INTERRUPTER

[75] Inventor: Victor V. Aromin, West Warwick, R.I.

[73] Assignee: Tower Manufacturing Corporation, Providenc, R.I.

[ * ] Notice: This patent is subject to a terminal disclaimer.

[21] Appl. No.: 09/164,491

[22] Filed: Oct. 1, 1998

[51] Int. Cl.$^7$ ...................................................... H02H 3/16
[52] U.S. Cl. .................................. 361/49; 361/42
[58] Field of Search .............................. 361/42–49, 114, 361/115, 143–144, 160, 170, 189, 194

[56] References Cited

U.S. PATENT DOCUMENTS

| | | | |
|---|---|---|---|
| 3,936,699 | 2/1976 | Adams ........................................ | 361/45 |
| 4,344,100 | 8/1982 | Davidson et al. . | |
| 4,542,432 | 9/1985 | Nichols, III et al. . | |
| 4,578,732 | 3/1986 | Draper et al. .............................. | 361/45 |
| 4,618,907 | 10/1986 | Leopold . | |
| 4,816,957 | 3/1989 | Irwin ........................................ | 361/45 |
| 5,177,657 | 1/1993 | Baer et al. . | |
| 5,418,678 | 5/1995 | McDonald ................................ | 361/46 |
| 5,583,730 | 12/1996 | Gershen et al. . | |
| 5,757,598 | 5/1998 | Aromin . | |

*Primary Examiner*—Jeffrey Gaffin
*Assistant Examiner*—Kim Huynh
*Attorney, Agent, or Firm*—Kriegsman & Kriegsman

[57] ABSTRACT

A ground fault circuit interrupter (GFCI) interrupts the flow of current through a pair of lines extending between a source of power and a load. The GFCI includes a circuit breaker having a switch located in one of the pair of lines. The switch has a first position in which the source of power in its associated line is not connected to the load and a second position in which the source of power in its associated line is connected to the load. A relay circuit is coupled to the switch selectively positioning the switch in either the first or second position. The relay circuit includes a solenoid which operates in either an energized or a de-energized state. The GFCI also includes a booster circuit for selectively supplying a first voltage through the switch and to the solenoid which is sufficient to cause the solenoid to switch from its de-energized state to its energized state. A power supply circuit supplies a second voltage to the solenoid which is less than the first voltage. The second voltage is sufficient to maintain the solenoid in its energized state after being initially energized by the first voltage. A latch circuit operable in first and second bi-stable states allows the solenoid to switch from its de-energized state to its energized state. A fault detecting circuit detects the presence of a fault condition in at least one of the lines and causes the latch circuit to latch in its second bi-stable state upon detection of the fault condition.

17 Claims, 8 Drawing Sheets

GROUND FAULT CIRCUIT INTERRUPTER

BACKGROUND OF THE INVENTION

The present invention relates generally to electrical safety devices and more particularly to ground fault circuit interrupters (GFCI).

Conventional electrical appliances typically receive alternating current (AC) power from a power supply, such as an electrical outlet, through a pair of conducting lines. The pair of conducting lines, often referred to as the line and neutral conductors, enable the electrical appliance, or load, to receive the current necessary to operate.

The connection of an electrical appliance to a power supply by a pair of conducting lines creates a number of potentially dangerous conditions. In particular, there exists the risk of ground fault and grounded neutral conditions in the conducting lines. A ground fault condition occurs when there is an imbalance between the currents flowing in the line and neutral conductors. A grounded neutral condition occurs when the neutral conductor is grounded at the load. A ground fault condition is extremely dangerous and can result in serious injury.

Ground fault circuit interrupters are well known in the art and are commonly used to protect against ground fault and grounded neutral conditions. In general, GFCI devices sense the presence of ground fault and grounded neutral conditions in the conducting lines, and in response thereto, open at least one of the conducting lines between the power supply and the load to eliminate the dangerous condition.

In U.S. Pat. No. 5,177,657, to M. Baer et al, there is disclosed a ground fault interrupter circuit which interrupts the flow of current to a pair of lines extending between a source of power and a load. The ground fault interrupter circuit includes a circuit breaker comprising a normally open switch located in one or both of the lines, a relay circuit for selectively closing the normally open switch, an electronic latch circuit operable in first and second bi-stable states and a fault sensing circuit for sensing the presence of a fault condition in at least one of the lines. The electronic latch circuit causes the relay circuit to close the normally open switch and maintain the normally open switch in its closed position when the electronic latch circuit is in the first bi-stable state. The electronic latch circuit also causes the relay circuit to permit the normally open switch to return to its normally open condition when the latch circuit is in its second bi-stable state. A fault sensing circuit senses the presence of a fault condition in at least one of the lines and causes the electronic latch to latch in its second state upon detection of the fault condition.

In U.S. Pat. No. 5,418,678 to T. M. McDonald, there is disclosed an improved ground fault circuit interrupter (GFCI) device which requires manual setting following initial connection to an AC power source or termination of a power source interruption. The improved GFCI device utilizes a controlled switching device which is responsive to a load power signal for allowing the relay contact sets of the GFCI device to be closed only when power is being made available at the output or load terminals. The controlled switching device preferably comprises an opto-isolator or other type of switching device which provides isolation between the GFCI input and output terminals when the relay contact sets are open. The improved GFCI device may be incorporated into portable units, such as plug-in or line cord units, for use with unprotected AC receptacles.

In U.S. Pat. No. 4,816,957 to L. F. Irwin there is disclosed an adapter unit comprising a moisture resistant housing within which is carried an improved, self testing ground line fault interrupter device. The improved device is electrically interconnected with a connector carried externally of the adapter housing so that the unit can be plugged directly into a standard duplex outlet of an existing circuit. The apparatus includes circuitry that automatically tests the operability of the device when it is plugged into a duplex outlet without the need for manual manipulation of test buttons or other overt action by the user.

In U.S. Pat. No. 4,578,732 to C. W. Draper et al there is disclosed a wall socket type ground fault circuit interrupter having a pair of sockets, a reset button and a test button that are accessible from the front of the interrupter. The interrupter has latched snap-acting contacts and a novel latching relay structure for releasably maintaining the snap-acting contacts in a circuit making position. The snap-acting contacts permit all of the components including the monitoring toroids and the power supply to be respectively located and connected at the load side of the snap-acting contacts so that all of the circuits of the interrupter are de-energized when the contacts snap to a circuit opening position. The snap-acting contact mechanism and relay are provided with structures which provide the interrupter with a trip-free mode of contact actuation and accordingly a tease-proof snap-acting contact operation.

One drawback of GFCI devices of the type described above is that the GFCI device generally includes a large solenoid to selectively open and close the switching device. Specifically, the solenoid generally requires a constant supply of line voltage (approximately 120 volts) in order to switch and sustain the solenoid in its energized state. As a consequence, the solenoid acts as a large power drain source. In addition, the constant supply of line voltage to the solenoid causes the solenoid to heat up significantly and potentially burn out.

SUMMARY OF THE INVENTION

It is an object of the present invention to provide a new and improved ground fault circuit interrupter (GFCI).

It is another object of the present invention to provide a GFCI which senses the presence of ground fault and grounded neutral conditions in the conducting lines, and in response thereto, includes a solenoid which opens at least one of the conducting lines between the power supply and the load.

It is yet another object of the present invention to provide a GFCI of the type described above wherein the solenoid can be energized and sustained in the energized state with minimal power drain.

It is still another object of the present invention to provide a GFCI of the type described above wherein the solenoid can be energized and sustained in the energized state with minimal heat build-up.

It is a further object of the present invention to provide a GFCI of the type described above which may be mass produced, has a minimal number of parts, and can be easily assembled.

A GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, a booster circuit for selectively supplying a first voltage to the solenoid sufficient to cause said solenoid to switch from its de-energized state to its energized state, said first voltage being supplied to said solenoid through said switch when said switch is in its first position, a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, a latch circuit operable in first and second bi-stable states, said latch circuit allowing said solenoid to switch from its de-energized state to its energized state and remain in its energized state when in said first bi-stable state and causing said solenoid to switch from its energized state to its de-energized state and remain in its de-energized state when in said second bi-stable state, and a fault detecting circuit for detecting the presence of a fault condition in at least one of said lines extending between the power and the load and for causing said latch circuit to latch in its second bi-stable state upon detection of said fault condition.

Another GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de-energized state and means coupled to said solenoid for controlling the state of said solenoid, said solenoid setting said switch in said second position when in its energized state and setting said switch in said first position when in its de-energized state, a booster circuit for selectively supplying a first voltage to the solenoid sufficient to cause said solenoid to switch from its de-energized state to its energized state, said first voltage being supplied to said solenoid through said switch when said switch is in its first position, a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, and a fault detecting circuit for detecting the presence of a fault condition in at least one of said lines extending between the power and the load and for causing said latch circuit to latch in its second bi-stable state upon detection of said fault condition.

Another GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, a power supply circuit for supplying power to said GFCI, a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state, a fault detecting circuit for detecting the presence of a fault condition in at least one of said lines extending between the power and the load and for causing said latch circuit to latch in its second bi-stable state upon detection of said fault condition, and a trip indicating circuit for indicating that said fault detecting circuit has detected a fault condition.

Another GFCI constructed according to this invention for interrupting the flow of current through a pair of lines extending between a source of power and a load comprises a circuit breaker having a switch located in one of said lines, said switch having a first position in which the source of power in its associated line is not connected to the load and a second position in which the source of power in its associated line is connected to the load, a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, a power supply circuit for supplying power to said GFCI, said power supply circuit including means for applying either a first voltage to said solenoid or a second voltage to said solenoid, a latch circuit operable in first and second bi-stable states, said latch circuit allowing said solenoid to switch from its de-energized state to its energized state and remain in its energized state when in said first bistable state and said latch circuit causing said solenoid to switch from its energized state to its de-energized state and remain in its de-energized state when in said second bi-stable state, and a fault detecting circuit for detecting the presence of a fault condition in at least one of said lines extending between the power and the load and for causing said latch circuit to latch in its second bi-stable state upon detection of said fault condition.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF PREFERRED EMBODIMENTS

Figure 1:
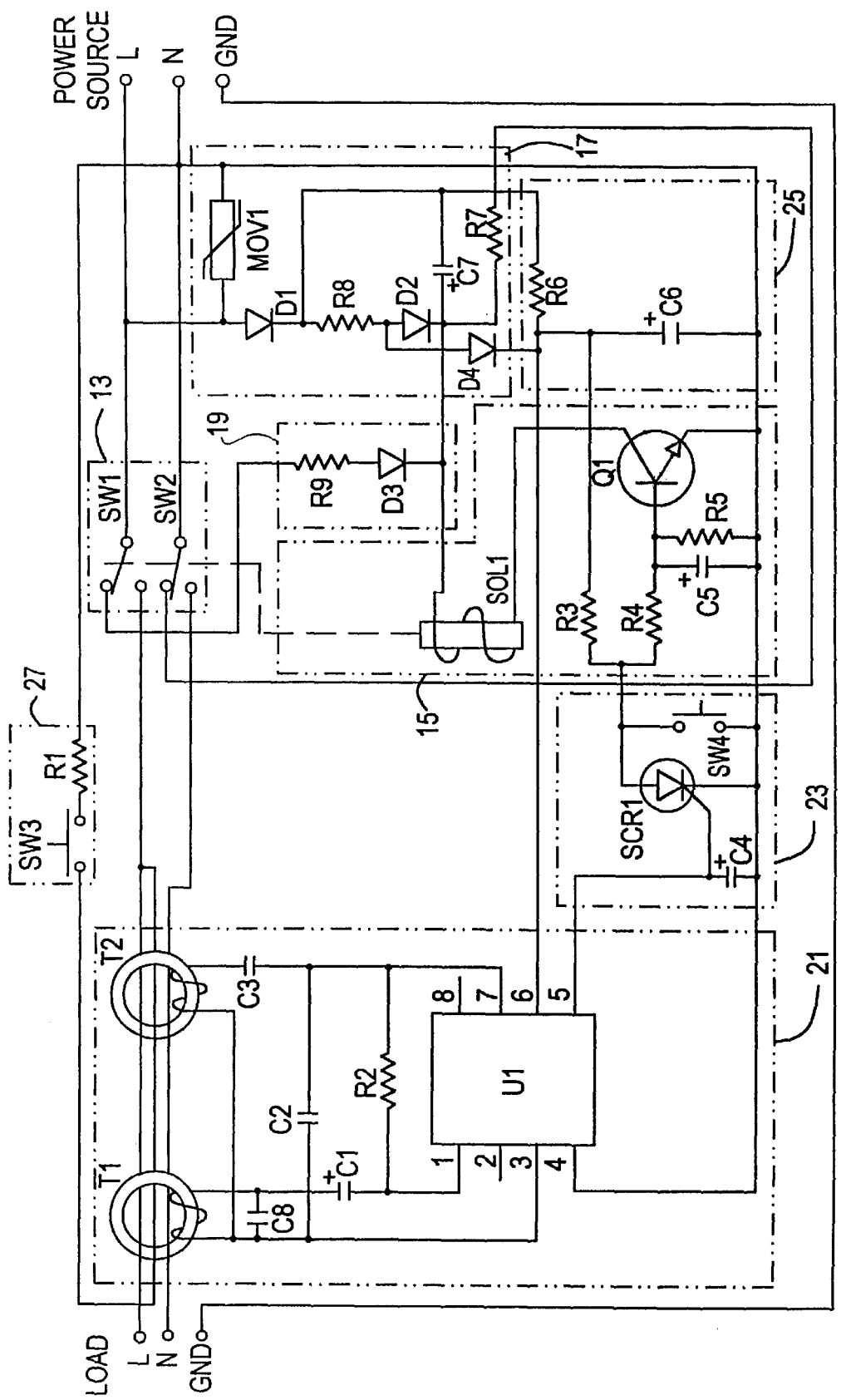
FIG. 1 is a schematic circuit diagram of a ground fault circuit interrupter (GFCI) of the present invention.

Referring now to the drawings and more particularly to FIG. 1, there is shown a ground fault circuit interrupter (hereinafter GFCI) constructed according to the teachings of the present invention, the GFCI being represented generally by reference numeral 11.

As will be discussed in detail below, GFCI 11 is automatically set to protect a load from ground fault conditions upon the initial plugging in of the load to a power source. GFCI 11 is also automatically set to protect the load from ground fault conditions once power is restored to the power source after a loss of power. Furthermore, once GFCI 11 protects the load from a ground fault condition, GFCI 11 can be manually reset to protect against further ground fault conditions.

GFCI 11 includes a circuit breaker 13, a relay circuit 15, a power supply circuit 17, a booster circuit 19, a fault detection circuit 21, a bi-stable electronic latch circuit 23, a filter circuit 25 and a test circuit 27.

Circuit breaker 13 includes a pair of single-pole, double-throw switches SW1 and SW2 which are located in the line and neutral conductive lines, respectively, between a power source and a load. Circuit breaker 13 acts to selectively open and close the pair of conductive lines. Switches SW1 and SW2 can be positioned in either of two connective positions. In the first connective position, which is illustrated in FIG. 1, switches SW1 and SW2 are positioned such that the power source is not connected to the load but is connected to booster circuit 19. In the second connective position, which is the opposite position illustrated in FIG. 1, switches SW1 and SW2 are positioned such that the power source is connected to the load but not to booster circuit 19. In both positions, the power source is connected to power supply 17.

Relay circuit 15 acts to selectively position switches SW1 and SW2 in either its first connective position or its second connective position. Relay circuit 15 comprises a solenoid SOL1, a transistor Q1, a load resistor R3, a pair of voltage divider resistors R4 and R5, and noise suppression capacitor C5.

Solenoid SOL1 is ganged to the circuit breaker contacts of switches SW1 and SW2 and is responsible for selectively controlling the connective position of switches SW1 and SW2. Before power is applied to GFCI 11, solenoid SOL1 positions switches SW1 and SW2 in their first connective position. After power is applied to GFCI 11, switches SW1 and SW2 will remain in their first connective position. When solenoid SOL1 is energized, solenoid SOL1 positions switches SW1 and SW2 in their second connective position.

It should be noted that the particular construction of solenoid SOL1 is unique for conventional GFCI devices. In particular, SOL1 is significantly small in size and requires less power than most solenoids used in prior art GFCI devices. Specifically, solenoid SOL1 has a coil resistance of 5,000 ohms. As a result of the unique construction of solenoid SOL1, line voltage (approximately 120 volts) must be directly supplied to solenoid SOL1 in order to initially energize solenoid SOL1 from its de-energized state. But more importantly, once energized, a constant voltage of only approximately 28 volts is required to be supplied to solenoid SOL1 in order to keep it in its energized state. As will be discussed in detail below, booster circuit 19 is responsible for providing the line voltage to initially energize solenoid SOL1 from its de-energized state and power supply circuit 17 is responsible for supplying the constant voltage of approximately 28 volts to maintain solenoid SOL1 in its energized state. The reduction in the voltage required to maintain solenoid SOL1 in its energized state (approximately 92 volts) significantly reduces the power drain of SOL1 in circuit 11 and also reduces heat build-up which could cause solenoid SOL1 to burn out.

Transistor Q1 is preferably an MPSA42 transistor sold by Motorola Corporation and acts to control the current supplied to energize solenoid SOL1. When transistor Q1 is off, current cannot flow through solenoid SOL1. On the other hand, when transistor Q1 is on, current can flow through solenoid SOL1. Load resistor R3 has a value of 4.7 Kohms and acts to control a rectifier (to be described in detail below) in latch circuit 23. Voltage divider resistors R4 and R5 each have a value of 22 Kohms and together act to provide the necessary base current to enable transistor Q1 to turn on. Noise suppression capacitor C5 has a value of 0.1 uF and acts to filter out noise in GFCI 11.

Power supply circuit 17 acts to provide power for GFCI circuit 11. Power supply circuit 17 comprises a metal oxide varistor MOV1, a silicon rectifier D1, a voltage dropping resistor R8, a filter capacitor C7, a bleeder resistor R7, a silicon rectifier D2 and a silicon rectifier D4. Varistor MOV1 has a value of 150 volts and acts to protect against a voltage surge from the AC power source. Silicon rectifier D1 is preferably an IN4005 and acts to convert the AC current in the line from the power source into a DC current. Voltage dropping resistor R8 has a value of 5.1 Kohms and acts to limit the constant input voltage supplied to solenoid SOL1 for the reasons noted above. Specifically, resistor R8 drops the line voltage in the line to approximately 28 volts before it is directly supplied to solenoid SOL1. Filter capacitor C7 has a value of 22 uF and acts to filter the constant voltage supplied to solenoid SOL1. Bleeder resistor R7 has a value of 100 Kohms and acts to bleed the charge of capacitor C7 when the load is unplugged from the power source. Silicon rectifier D2 is preferably a IN4005 and acts to prevent the DC voltage surge provided by booster circuit 19 (which will be discussed in detail below) from entering into in other parts of GFCI 11. Silicon rectifier D4 is preferably an IN4005 and acts as a voltage regulator for solenoid SOL1 and also acts to speed up the charge in filter circuit 25 for quick filtering.

Booster circuit 19 acts to provide a temporary voltage sufficient to initially energize solenoid SOL1 from its de-energized state. Booster circuit 19 comprises a silicon rectifier D3 and a surge limit resistor R9. Rectifier D3 is preferably an IN4005 and acts to convert the AC power in the line of the power source to DC power. When switch SW1 is in its first position and upon the application of power to GFCI 11, rectifier D3 provides an instant DC voltage to solenoid SOL1 causing solenoid SOL1 to energize which, in turn, causes solenoid SOL1 to move switches SW1 and SW2 to their second connective position. When switches SW1 and SW2 are moved to their second connective position, booster circuit 19 is disconnected from the power source. Resistor R9 has a value of 47 ohms and acts to protect rectifier D3 and capacitor C7 from overcurrents.

Fault detection circuit 21 acts to detect both ground fault and grounded neutral conditions in the conductive lines when switches SW1 and SW2 are in their second connective position. Fault detection circuit 21 comprises a sense transformer T1, a grounded neutral transformer T2, a coupling capacitor C1, a pair of noise suppression capacitors C2 and C8, a feedback resistor R2 and a ground fault interrupter chip U1. Transformer T1 is preferably a C-5029-01-00 transformer sold by Magnetic Metals and transformer T2 is preferably a F-3006-01 transformer sold by Magnetic Metals. Sense transformer T1 senses the current differential between the line and neutral conductive lines, and upon the presence of a ground fault condition, transformer T1 induces an associated output from its secondary windings. Grounded neutral transformer T2 acts in conjunction with transformer T1 to sense the presence of grounded neutral conditions and, in turn, induce an associated output. Coupling capacitor C1 has a value of 47 uF and acts to couple the AC signal from the secondary winding of transformer T1 to chip U1. Noise suppression capacitor C2 has a value of 4700 pF and noise suppression capacitor C8 has a value of 1000 pF. Together capacitors C2 and C8 act to prevent fault detection circuit 21 from operating in response to line disturbances such as electrical noise and lower level faults. Tuning capacitor C3 has a value of 0.033 uF and feedback resistor has a value of 909 Kohms. Together capacitor C3 and resistor R2 act to set the minimum fault current at which fault detection circuit 21 provides an output signal to latch circuit 23. Interrupter chip U1 is preferably an RV4145 low power ground fault interrupter circuit sold by Raytheon Corporation. Chip U1 serves to amplify the fault signal generated by transformer T1 and provide an output pulse on pin 5 to activate latch circuit 23.

Latch circuit 23 acts to take the electrical signal produced by fault detection circuit 21 upon the detection of a ground fault or grounded neutral condition and, in turn, de-energize solenoid SOL1. Latch circuit 23 comprises a silicon controlled rectifier SCR1 operable in either a conductive or a non-conductive state, a noise suppression capacitor C4 and a reset switch SW4. Rectifier SCR1 is preferably an EC103A rectifier sold by Teccor Corporation and acts to selectively turn on and off transistor Q1 in relay circuit 15. Noise suppression capacitor C4 has a value of 2.2 uF and acts in preventing rectifier SCR1, when in its nonconductive state, from firing as a result of electrical noise in circuit 11. Reset switch SW4 is a conventional push-in type switch and acts when depressed to remove holding current from the anode of rectifier SCR1, causing rectifier SCR1 to turn off when it is in its conductive state.

Filter circuit 25 acts to smooth out the varying DC voltage provided from the power supply and provide a filtered DC voltage to the power input of chip U1. Filter circuit 25 includes a voltage dropping resistor R6 which preferably has a value of 18 Kohms and acts to regulate the appropriate voltage supplied to chip U1. Filter circuit 25 also includes a DC filter capacitor C6 which preferably has a value of 3.3 uF and acts to filter the ripple of the voltage supplied to chip U1.

Test circuit 27 provides a means of testing whether circuit 11 is functioning properly. Test circuit 27 comprises a current limiting resistor R1 having a value of 15 Kohms and a test switch SW3 of conventional push-in type design. When SW3 is depressed to energize test circuit 27, resistor RI provides a simulated fault current to transformer T1 which is similar to a ground fault condition.

In use, GFCI 11 functions in the following manner. Prior to initial connection, switches SW1 and SW2 are normally in their first connective position as shown in FIG. 1.

Upon initial connection of GFCI 11 at one end to the load and at the other end to the power source, line voltage of approximately 120 volts is applied to solenoid SOL1 through booster circuit 19 and energizes solenoid SOL1. Once solenoid SOL1 is energized, solenoid SOL1 causes switches SW1 and SW2 to move into their second connective position (opposite the position shown in FIG. 1), thereby eliminating the supply of power into solenoid SOL1 from booster circuit 19. However, since a constant 28 volts is supplied to solenoid SOL1 from power supply circuit 17, solenoid SOL1 is maintained in its energized state.

With solenoid SOL1 maintained in its energized state rectifier SCR1 is in a nonconductive state and transistor Q1 is on, which enables current to pass to solenoid SOL1. Upon the detection of a ground fault or grounded neutral condition, fault detection circuit 21 sends a current to rectifier SCR1 causing rectifier SCR1 to be in a conductive state which, in turn, turns off transistor Q1. With transistor Q1 off, current does not pass to solenoid SOL1 and therefore solenoid SOL1 becomes de-energized. Once de-energized, solenoid SOL1 causes switches SW1 and SW2 to return to its first connective position, thereby cutting off power from the power source to the load.

Once the fault condition is removed, circuit 11 can be reset by manually depressing switch SW4. Depression of switch SW4 causes current to pass through reset switch SW4 instead of rectifier SCR1, which turns off rectifier SCR1. This, in turn, turns transistor Q1 back on which enables solenoid SOL1 to become re-energized.

With the load plugged into the power source, if there is a loss of power at the power source, solenoid SOL1 will become de-energized, moving switches SW1 and SW2 back to their first connective position. When power is subsequently restored, solenoid SOL1 will become re-energized again, which causes switches SW1 and SW2 to move to their second position.

Figure 2:
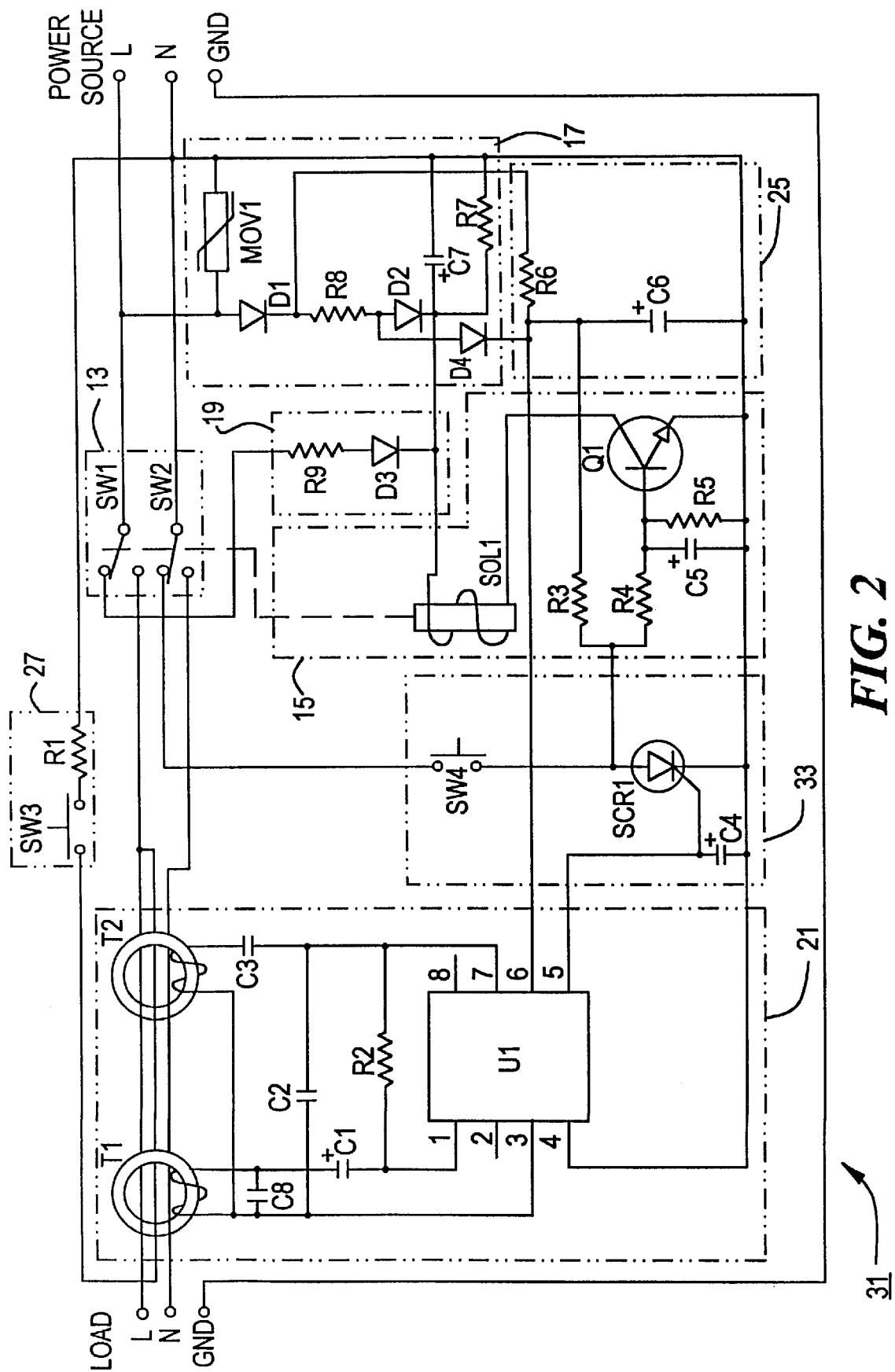
FIG. 2 is a schematic circuit diagram of another GFCI of the present invention.

FIG. 2 shows another ground fault circuit interrupter (GFCI) constructed according to the teachings of the present invention, the GFCI being represented generally by reference numeral 31.

GFCI 31 is automatically set to protect a load from ground fault conditions upon the initial plugging in of the load to a power source. GFCI 31 is also automatically set to protect the load from ground fault conditions once power is restored to the power source after a loss of power. Furthermore, once GFCI 31 protects the load from a ground fault condition, GFCI 31 can be manually reset to protect against further ground fault conditions.

GFCI 31 is similar in construction to GFCI 11, with the exception being the connection of reset switch SW4 and the connection of bleeder resistor R7. In latch circuit 23 of GFCI 11, reset switch SW4 is connected in parallel with rectifier SCR1 across its anode to its cathode. To the contrary, in latch circuit 33 of GFCI 31, reset switch SW4 is connected in series with rectifier SCR1, one end of switch SW4 being connected to the anode of rectifier SCR1 and the other end being connected to switch SW2. In GFCI 11, bleeder resistor R7 is connected to the positive terminal of filter capacitor C7 and switch SW2. To the contrary, in GFCI 31, bleeder resistor R7 is connected to the positive terminal of filter capacitor C7 and the neutral conductive line.

In use, GFCI 31 functions in a similar manner to GFCI 11. In both GFCI 11 and GFCI 31, if a ground fault condition is detected by the fault detection circuit, silicon controlled rectifier SCR1 turns on, which turns off transistor Q1 which, in turn, de-energizes solenoid SOL1. GFCI 11 and GFCI 31 function differently.

Specifically, if reset switch SW4 in GFCI 11 is depressed while solenoid SOL1 is in its energized position, rectifier SCR1 will be turned off for so long as switch SW4 is depressed. This causes transistor Q1 to temporarily turn off which, in turn, de-energizes solenoid SOL1 which interrupts power to the load.

To the contrary, if reset switch SW4 in GFCI 31 is depressed while in this condition, rectifier SCR1 will remain turned off regardless of whether switch SW4 is depressed. This prevents solenoid SOL1 from ever becoming de-energized so as to interrupt power to the load.

Figure 3:
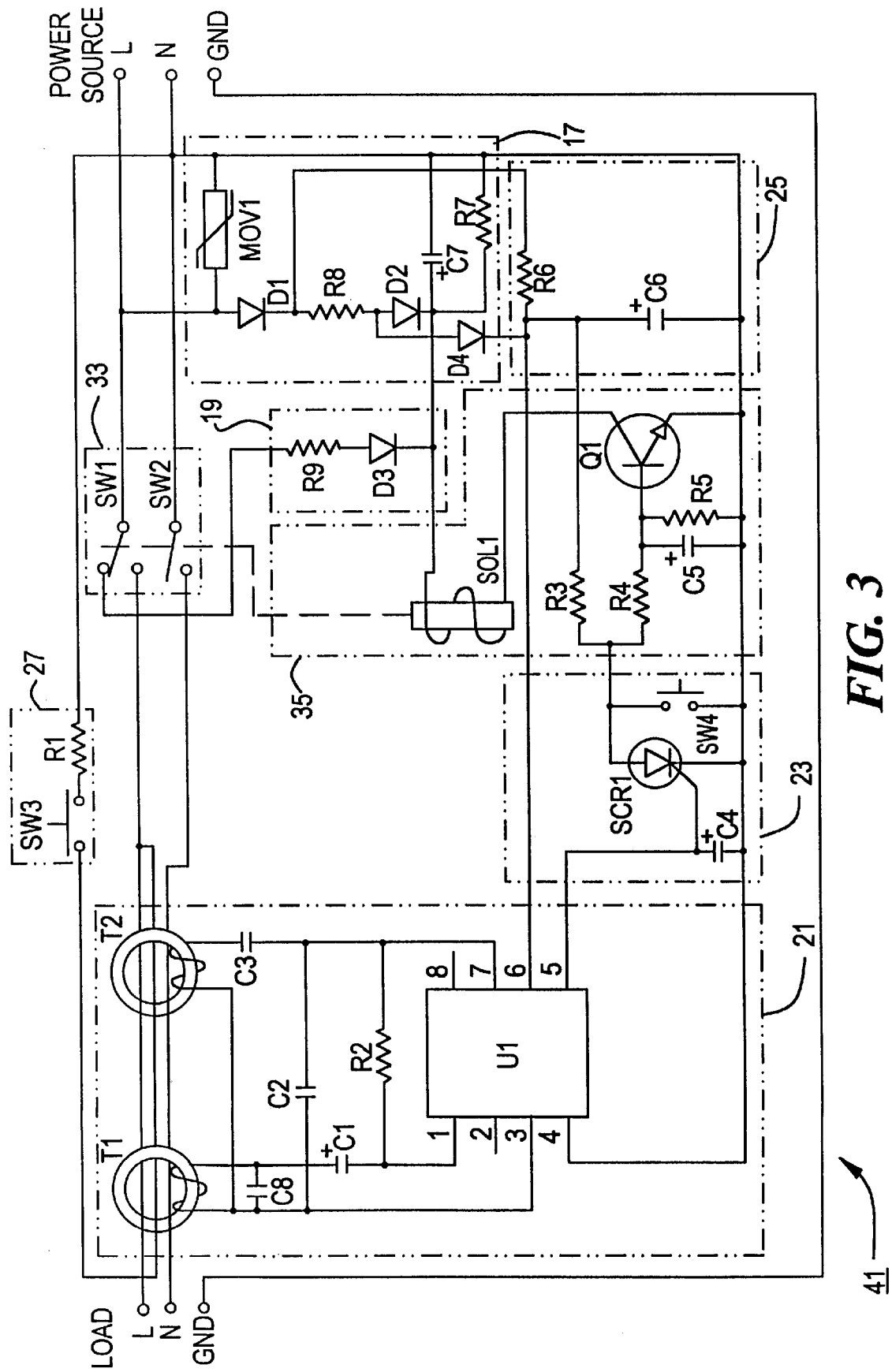
FIG. 3 is a schematic circuit diagram of another GFCI of the present invention.

FIG. 3 shows another ground fault circuit interrupter (GFCI) constructed according to the teachings of the present invention, the GFCI being represented generally by reference numeral 41.

GFCI 41 is automatically set to protect a load from ground fault conditions upon the initial plugging in of the load to a power source. GFCI 41 is also automatically set to protect the load from ground fault conditions once power is restored to the power source after a loss of power. Furthermore, once GFCI 41 protects the load from a ground fault condition, GFCI 41 can be manually reset to protect against further ground fault conditions.

GFCI 41 includes a circuit breaker 33, a relay circuit 35, a power supply circuit 17, a booster circuit 19, a fault detection circuit 21, a latch circuit 23, a filter circuit 25 and a test circuit 27. GFCI 41 differs from GFCI 11 only in the type of one switch used in the circuit breaker and in the value of the capacitor in the relay circuit.

Specifically, in GFCI 41, circuit breaker 33 includes a single-pole, double-throw switch SW1 and a normally open single-pole, single-throw switch SW21. When switch SW21 is open, as illustrated in FIG. 3, the neutral conductive line from the power source is not connected to the load. Whereas, when switch SW21 is closed, the neutral conductive line from the power source is connected to the load. To the contrary, in circuit breaker 13 in GFCI 11 both switches SW1 and SW2 are single-pole, single-throw switches.

Additionally, noise suppression capacitor C15 in relay circuit 35 of GFCI 41 has a value of 1 uF whereas capacitor C5 in relay circuit 19 has a value of 0.1 uF.

Figure 4:
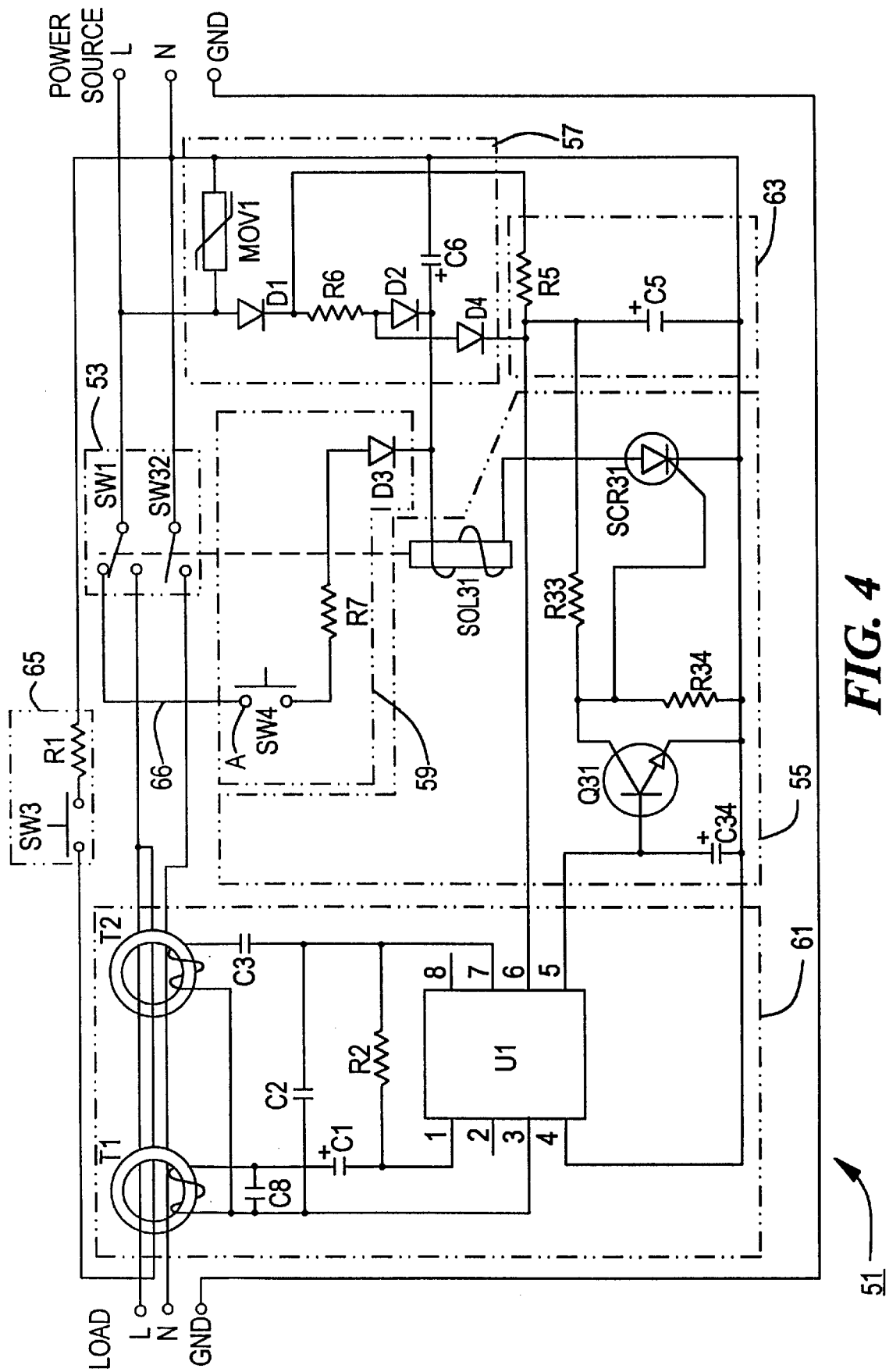
FIG. 4 is a schematic circuit diagram of another GFCI of the present invention.

FIG. 4 shows another ground fault circuit interrupter (GFCI) constructed according to the teachings of the present invention, the GFCI being represented generally by reference numeral 51.

As will be discussed in detail below, GFCI 51 requires manual depression of a reset switch in order to protect a load from ground fault conditions upon the initial plugging in of the load to a power source. GFCI 51 also requires manual depression of a reset switch in order to protect the load from ground fault conditions once power is restored to the power source after a loss of power. Furthermore, once GFCI 51 protects the load from a ground fault condition, GFCI 51 requires a manual reset to protect against further ground fault conditions.

GFCI 51 comprises a circuit breaker 53, a relay circuit 55, a power supply circuit 57, a booster circuit 59, a fault detection circuit 61, a filter circuit 63 and a test circuit 65. Fault detection circuit 61, filter circuit 63 and test circuit 65 are identical in construction and function to fault detection circuit 21, filter circuit 25 and test circuit 27, respectively.

Circuit breaker 53 differs from circuit breaker 13 only in that switch SW32 of circuit breaker 53 is a normally open single-pole, single-throw switch whereas switch SW2 in GFCI 11 is a single-pole, double-throw switch. Switch SW32 is positionable in either of two positions, namely, a first position in which it is open, as illustrated in FIG. 4, such that the AC power from the power source is disconnected to the load and a second position in which is is closed, such that the AC power from the power source is connected to the load.

Relay circuit 55 resembles a hybrid of relay circuit 15 and latch circuit 23 of GFCI 11. Specifically, relay circuit 55 comprises a solenoid SOL31, a transistor Q31, a silicon controlled rectifier SCR31, a load resistor R33, a bias resistor R34 and a noise suppression capacitor C34.

Solenoid SOL31 is identical in construction and function to solenoid SOL1. Transistor Q31 is preferably a 2N2222 transistor and acts to control the current supplied to rectifier SCR31. Rectifier 31 is preferably a EC103D rectifier manufactured by Teccor and acts in controlling whether current is supplied to solenoid SOL31. Load resistor R33 is preferably 39 Kohms and acts to provide collector voltage to transistor Q31. Bias resistor R34 is preferably 10 Kohms and acts, in association with resistor R3, to bias gate current to rectifier SCR31. Noise suppression capacitor C34 is preferably 2.2 uF and acts to prevent transistor Q31 from conducting as a result of electrical noise in the circuit.

Power supply circuit 57 is identical to power supply circuit 17 with the exception being that circuit 57 does not include the bleeder resistor R7 present in circuit 17.

Booster circuit 59 is identical to booster circuit 19 with the sole exception being that in circuit 51, reset switch SW4 is located in booster circuit 59, whereas in circuit 11 reset switch SW4 is located in latch circuit 23. The relocation of reset switch SW4 in booster circuit 59 enables circuit 51 to function as a manually operable GFCI device, as will be described in detail below.

In use, GFCI 51 functions in the following manner. Prior to initial connection, switches SW1 and SW32 are normally in their first connective position as shown in FIG. 1.

Upon initial connection of GFCI 51 at one end to the load and at the other end to the power source, switches SW1 and SW32 remain in their first position. With switches SW1 and SW32 in their first position, as shown in FIG. 4, switch SW1 is connected to terminal A in switch SW4 through line 66. When reset switch SW4 is depressed, line voltage passes through booster circuit 59 into solenoid SOL31, the line voltage of approximately 120 volts energizing the solenoid. Once solenoid SOL31 is energized, solenoid SOL31 causes switches SW31 and SW32 to move into their second connective position (opposite the position shown in FIG. 4), thereby eliminating the supply of power into solenoid SOL31 from booster circuit 59. However, since line voltage is converted into 28 volts by power supply circuit 57 and is constantly supplied to solenoid SOL31, solenoid SOL31 is maintained in its energized state.

With solenoid SOL31 maintained in its energized state, rectifier SCR31 is in a conductive state and transistor Q31 is off, which enables current to pass to solenoid SOL31. Upon the detection of a ground fault or grounded neutral condition, fault detection circuit 61 sends current to transistor Q31 which turns transistor Q31 on and, in turn, turns off rectifier SCR31. With rectifier SCR31 off, current does not pass into solenoid SOL31, causing solenoid SOL31 to become de-energized. Once de-energized, solenoid SOL31 causes switches SW1 and SW32 to return to their first position, thereby cutting off the supply of power from the power source to the load.

Once the fault condition is removed, circuit 51 can be reset by depressing reset switch SW34 and the cycle repeats.

Figure 5:
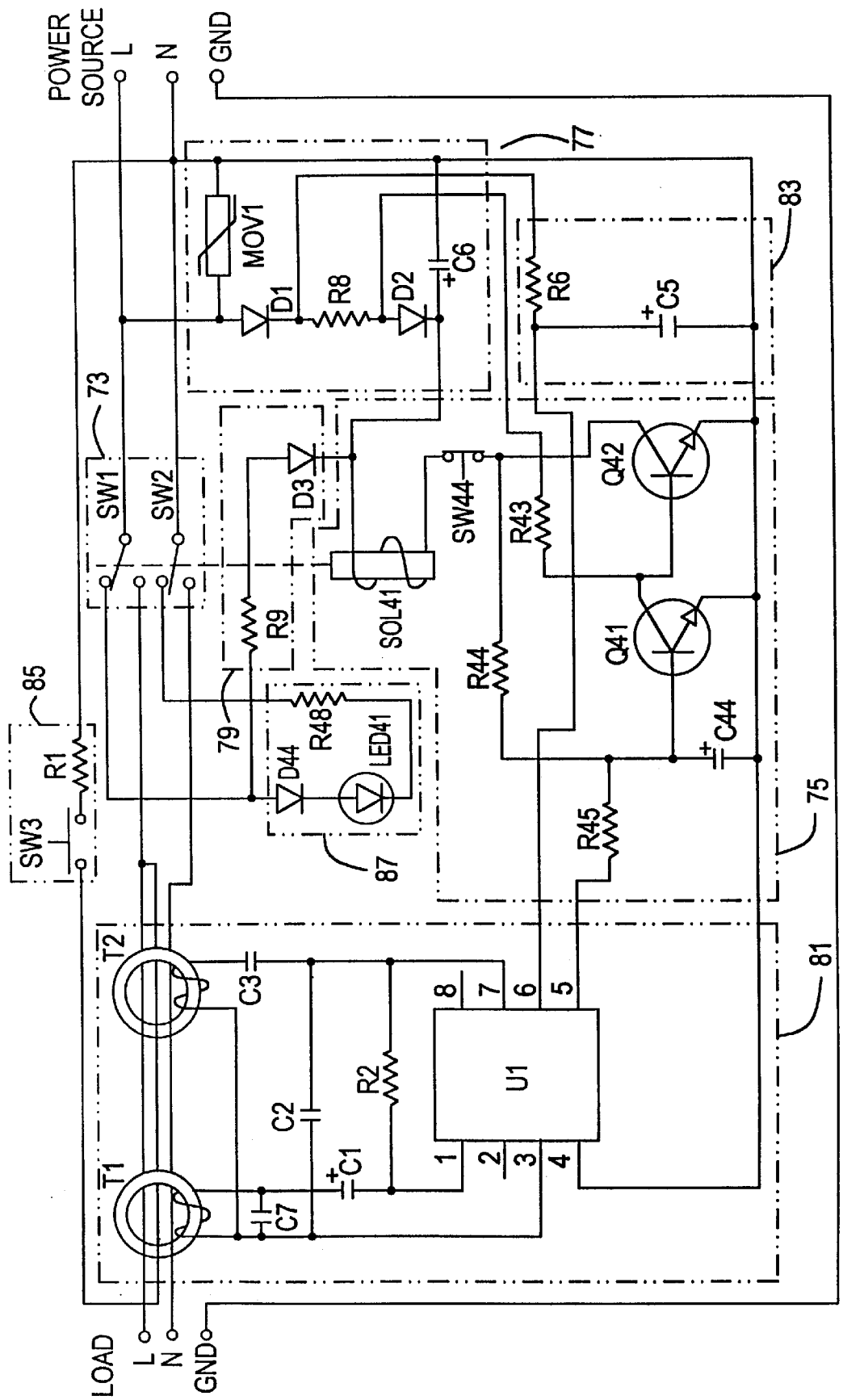
FIG. 5 is a schematic circuit diagram of another GFCI of the present invention.

FIG. 5 shows another ground fault circuit interrupter (GFCI) constructed according to the teachings of the present invention, the GFCI being represented generally by reference numeral 71.

GFCI 71 is automatically set to protect a load from ground fault conditions upon the initial plugging in of the load to a power source. GFCI 71 is also automatically set to protect the load from ground fault conditions once power is restored to the power source after a loss of power. Furthermore, once GFCI 71 protects the load from a ground fault condition, GFCI 71 can be manually reset to protect against further ground fault conditions.

GFCI 71 is similar in construction to GFCI 11. GFCI 71 comprises a circuit breaker 73, a relay circuit 75, a power supply circuit 77, a booster circuit 79, a fault detection circuit 81, a filter circuit 83 and a test circuit 85. GFCI 71 additionally includes a trip indicating circuit 87. Circuit breaker 73, fault detection circuit 81, filter circuit 83 and test circuit 85 are identical in construction and function to circuit breaker 13, fault detection circuit 21, filter circuit 25 and test circuit 27, respectively.

Relay circuit 75 resembles a hybrid of relay circuit 15 and latch circuit 23 of GFCI 11. Specifically, relay circuit 75 comprises a solenoid SOL41, a first transistor Q41, a second transistor Q42, a reset switch SW44, a load resistor R45, a feedback resistor R44, an input resistor R43 and a noise suppression capacitor C44.

Solenoid SOL41 is identical in construction and function to solenoid SOL1. First transistor Q41 is preferably an MPSA42 transistor and acts to control the current supplied to second transistor Q42. Second transistor Q42 is preferably a MPSA42 transistor and acts to control the current supplied to solenoid SOL41. Reset switch SW44 is a normally closed, pull-open type switch which connects solenoid SOL41 to second transistor Q42. Load resistor R45 is preferably 100 Kohms and acts to provide the required collector voltage for first transistor Q41. Feedback resistor R44 is preferably 68 Kohms and acts to provide base current to first transistor Q41. Input resistor R43 is preferably 2 Kohms and acts, in association with resistor R44, to bias the gate current to first transistor Q41. Noise suppression capacitor C44 is preferably 2.2 uF and acts to prevent first transistor Q41 from conducting as a result of electrical noise in the circuit.

Power supply circuit 77 is identical to power supply circuit 17 with the exception being that circuit 77 does not include the bleeder resistor R7 or the rectifier D4 present in circuit 17.

Trip indicating circuit 87 provides a means of visual indication that the GFCI has tripped in response to a ground fault or grounded neutral condition. Trip indicating circuit 87 includes a silicon rectifier D44, a light emitting diode LED41 and a current limiting resistor R48. Rectifier D44 is preferably an IN4004 rectifier and acts to convert the AC power of the line to DC power for diode LED41. Diode LED41 provides visual indication by means of a light that circuit 71 has tripped. Resistor R48 is preferably 47 Kohms and acts to limit the current which passes to diode LED41.

In use, GFCI 71 functions in the following manner. Prior to connection, switches SW1 and SW2 are in their first connective position as shown in FIG. 5.

Upon initial connection of GFCI 71 at one end to the load and at the other end to the power source, line voltage is supplied into booster circuit 79, which, in turn passes through resistor R9 and rectifier D3 into solenoid SOL41, the line voltage of approximately 120 volts energizing the solenoid. Once solenoid SOL41 is energized, solenoid SOL41 causes switches SW1 and SW2 to move into their second connective position (opposite the position shown in FIG. 5), thereby eliminating the supply of power into solenoid SOL41 from booster circuit 79. However, since line voltage is converted into 28 volts by power supply circuit 77 and is constantly supplied to solenoid SOL41, solenoid SOL41 is maintained in its energized state.

With solenoid SOL41 maintained in its energized state, first transistor Q41 is off and second transistor Q42 is on, thereby enabling current to pass into solenoid SOL41 to keep it in its energized state. Upon the detection of a ground fault or grounded neutral condition, fault detection circuit 81 sends a current to first transistor Q41 turning it on which, in turn, turns off second transistor Q42. With second transistor Q42 off, current does not pass through solenoid SOL41, causing solenoid SOL41 to become de-energized. Once de-energized, solenoid SOL41 causes switches SW1 and SW2 to return to their first connective position, thereby cutting off power from the power source to the load.

With switches SW1 and SW2 in their first connective position, line voltage passes into trip indicating circuit 87 which, in turn, causes light emitting diode LED41 to light up, thereby indicating that circuit 71 has been tripped.

Once the fault condition is removed, circuit 71 can be reset by pulling open reset switch SW44. Opening of switch SW44 turns off first transistor Q1, which enables solenoid SOL1 to become re-energized and the cycle repeats.

Figure 6:
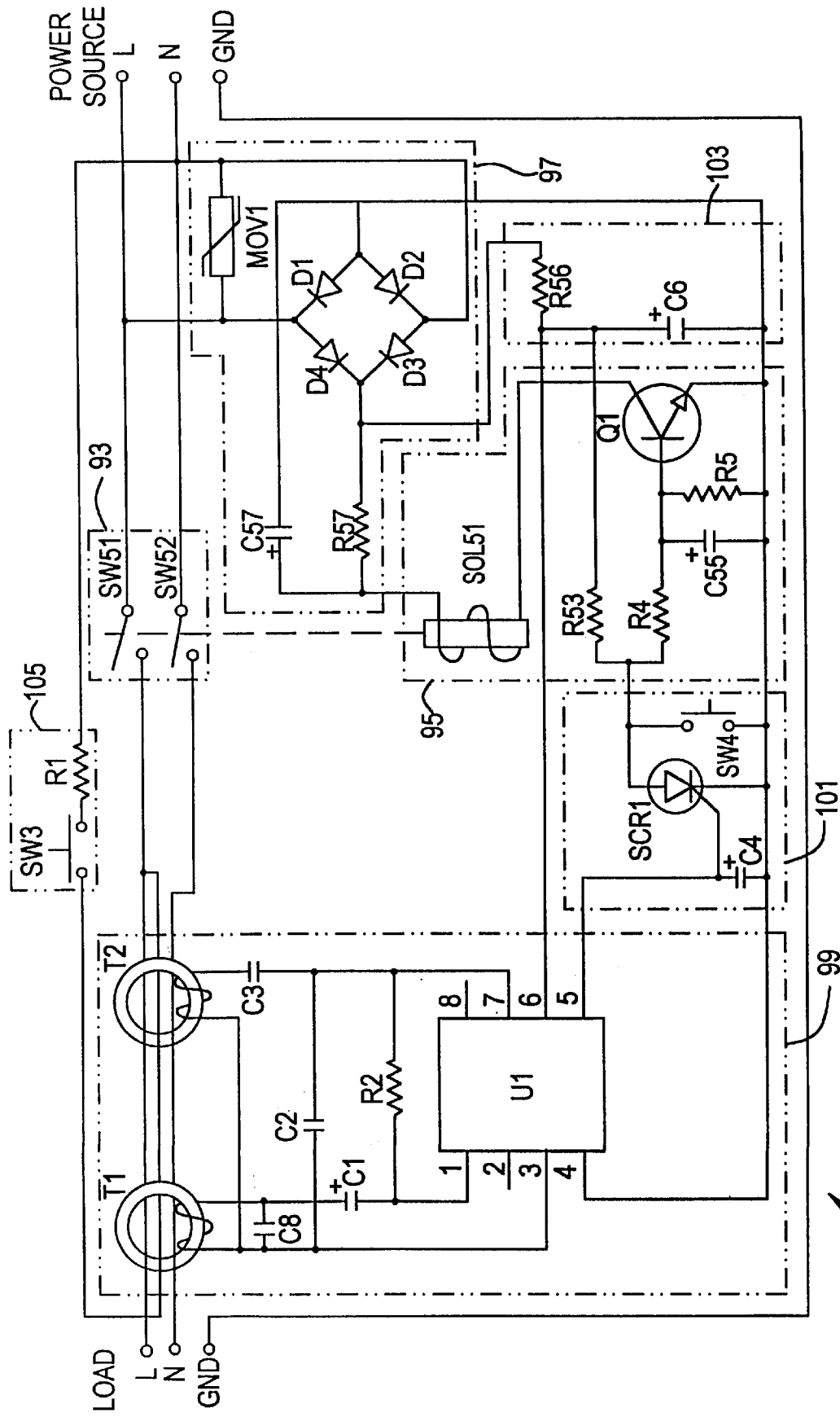
FIG. 6 is a schematic circuit diagram of another GFCI of the present invention.

FIG. 6 shows another ground fault circuit interrupter (GFCI) constructed according to the teachings of the present invention, the GFCI being represented generally by reference numeral 91.

As will be discussed in detail below, GFCI 91 requires manual depression of a reset switch in order to protect a load from ground fault conditions upon the initial plugging in of the load to a power source. GFCI 91 also requires manual depression of a reset switch in order to protect the load from ground fault conditions once power is restored to the power source after a loss of power. Furthermore, once GFCI 91 protects the load from a ground fault condition, GFCI 91 requires a manual reset to protect against further ground fault conditions.

GFCI 91 is similar in construction to GFCI 11. GFCI 91 includes a circuit breaker 93, a relay circuit 95, a power supply circuit 97, a fault detection circuit 99, a bi-stable electronic latch circuit 101, a filter circuit 103 and a test circuit 105. Fault detection circuit 99, latch circuit 101 and test circuit 105 are identical in construction and function to fault detection circuit 21, latch circuit 23 and test circuit 27, respectively.

Circuit breaker 93 differs from circuit breaker 13 in that switches SW51 and SW52 in circuit breaker 93 are both normally open, single-pole, single-throw switches rather than the single-pole, double-throw switches SW1 and SW2 found in circuit breaker 13. Switches SW51 and SW52 are positionable in either of two positions; a first position in which switches SW51 and SW52 are open, as illustrated in FIG. 6, such that the AC power from the power source is disconnected to the load, and a second position in which switches SW51 and SW52 are both closed, such that the AC power from the power source is connected to the load.

Relay circuit 95 is identical to relay circuit 15 except with regard to the values of the solenoid, the load resistor and the noise suppression capacitor. In particular, solenoid SOL51 has a coil resistance of 8,000 ohms, load resistor R53 has a value of 10 Kohms and noise suppression capacitor C55 has a value of 1 uF. Due to the increase in size in solenoid SOL51, solenoid SOL51 requires line voltage to both initially energize solenoid SOL51 and maintain solenoid SOL51 in its energized state.

Power supply circuit 97 comprises a metal oxide varistor MOV1, four silicon rectifiers D1, D2, D3 and D4, a voltage dropping resistor R57 and a storage capacitor C57. Rectifiers D1–D4 together form a conventional diode rectifier bridge to convert the AC power from the line into DC power. Voltage dropping resistor R57 has a value of preferably 5.1 Kohms and acts to limit the input voltage to solenoid SOL51 in order to prevent solenoid SOL51 from closing the circuit breaker contacts from their normally open position. Storage capacitor C57 has a value of preferably 22 uF and acts to charge to full line potential when transistor Q1 turns off, as will be described in detail below.

Filter circuit 103 is identical to filter 25 except in regards to the value of the voltage dropping resistor. Specifically, resistor R56 preferably has a value of 24 Kohms.

In use, GFCI 91 functions in the following manner. Prior to connection, switches SW51 and SW52 are in their first connective position as shown in FIG. 6.

Upon initial connection of GFCI 91 at one end to the load and at the other end to the power source, the voltage applied to solenoid SOL51 by power supply 97 through resistor R57, approximately 40 volts, is not enough voltage to energize solenoid SOL51. Once reset switch SW4 is depressed without being released, transistor Q1 turns off. With transistor Q1 turned off, current can not pass to solenoid SOL51 through resistor R57. This, in turn, causes capacitor C57 to instantaneously charge up to full line voltage.

Upon the release of the depression of switch SW4, transistor Q1 turns back on and starts to conduct which, in turn, causes capacitor C57 to dump its charged up line voltage of 120 volts into solenoid SOL51. This causes solenoid SOL51 to become energized which causes switches SW51 and SW52 to be moved into their second position (opposite the position shown in FIG. 6), thereby connecting the power source to the load.

Upon the detection of a ground fault or grounded neutral condition, fault detection circuit 99 sends a current to rectifier SCR1 which, in turn, turns off transistor Q1. With transistor Q1 off, current does not pass through solenoid SOL51 and solenoid SOL51 becomes de-energized. Once de-energized, solenoid SOL51 causes switches SW51 and SW52 to be returned to their first positions, thereby cutting off power from the power source to the load.

Once the fault condition is removed, circuit 91 can be reset by depressing switch SW4 and the cycle repeats.

Figure 7:
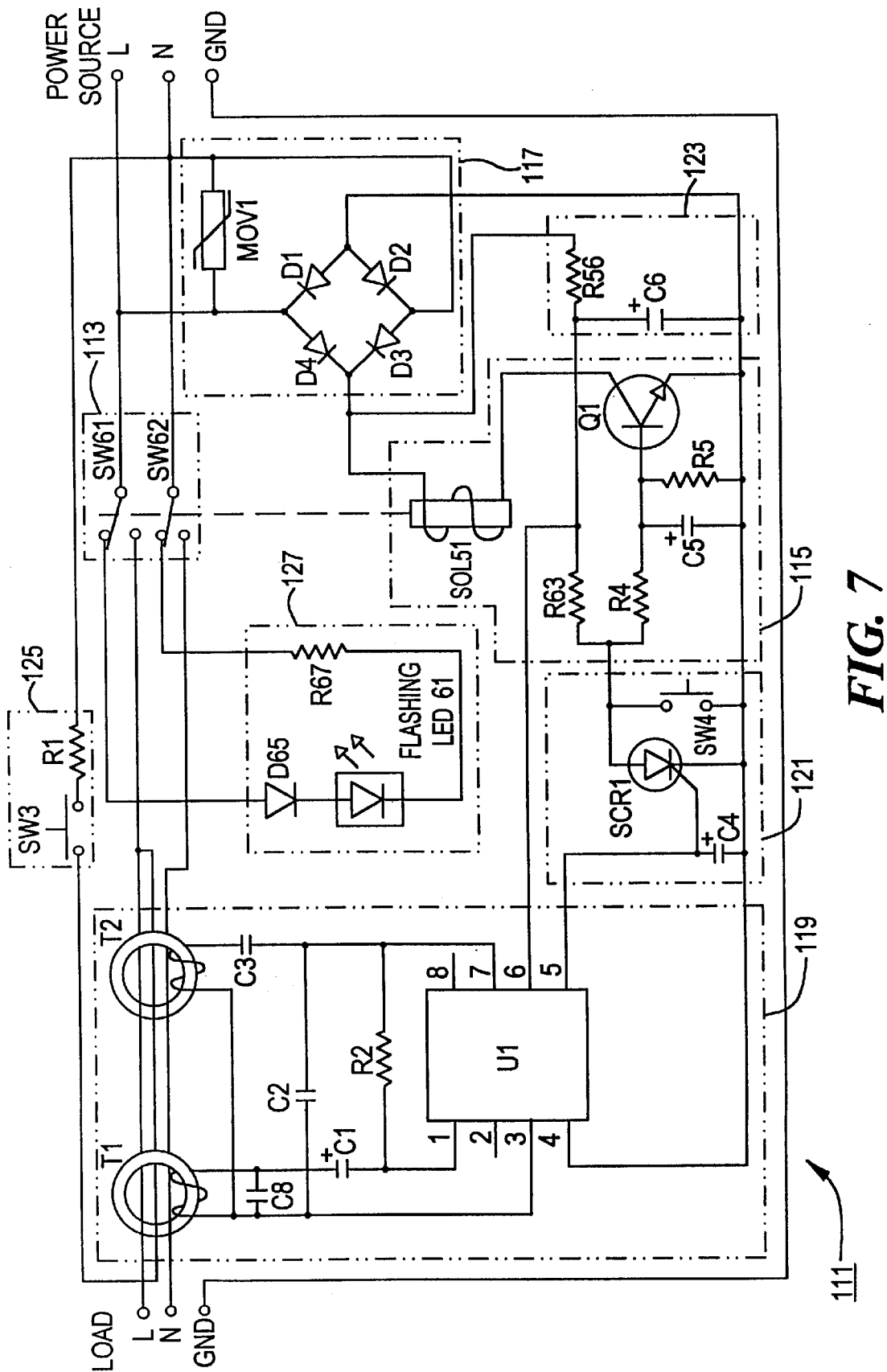
FIG. 7 is a schematic circuit diagram of another GFCI of the present invention.

FIG. 7 shows another ground fault circuit interrupter (GFCI) constructed according to the teachings of the present invention, the GFCI being represented generally by reference numeral 111.

GFCI 111 is automatically set to protect a load from ground fault conditions upon the initial plugging in of the load to a power source. GFCI 111 is also automatically set to protect the load from ground fault conditions once power is restored to the power source after a loss of power. Furthermore, once GFCI 111 protects the load from a ground fault condition, GFCI 111 can be manually reset to protect against further ground fault conditions.

GFCI 111 is similar in construction to GFCI 91. GFCI 111 comprises a circuit breaker 113, a relay circuit 115, a power supply circuit 117, a fault detection circuit 119, a latch circuit 121, a filter circuit 123 and a test circuit 125. GFCI 111 additionally includes a trip indicating circuit 127. Fault detection circuit 119, latch circuit 121, filter circuit 123 and test circuit 125 are identical in construction and function to fault detection circuit 99, latch circuit 101, filter circuit 103 and test circuit 105, respectively.

Circuit breaker 113 differs from circuit breaker 93 in that switches SW61 and SW62 of circuit breaker 113 are not single-pole, single-throw switches as in circuit breaker 93 but rather are both single-pole, double-throw switches positionable in either of two positions, namely a first position, as illustrated in FIG. 7, in which the AC power from the power source is disconnected to the load and instead is connected to trip indicating circuit 127, and a second position, opposite the position illustrated in FIG. 7, in which the AC power from the power source is connected to the load.

Relay circuit 115 is identical to relay circuit 95 with the exception of the value of the load resistor. Specifically, load resistor R63 preferably has a value of 4.7 Kohms.

Power supply circuit 117 is identical to power supply circuit 97 with the exception being that circuit 117 does not include the voltage dropping resistor R57 and the storage capacitor C57 found in circuit 97.

Trip indicating circuit 127 provides a means of visual indication that the GFCI has tripped in response to a ground fault or grounded neutral condition. Trip indicating circuit 127 includes a silicon rectifier D65, a flashing light emitting diode LED61 and a current limiting resistor R67. Rectifier D65 is preferably an IN4004 rectifier and acts to convert the AC power of the line to DC power for diode LED61. Diode LED61 provides a flashing visual indication by means of a light that circuit 111 has tripped. Resistor R67 is preferably 33 Kohms and acts to limit the current which passes to diode LED61.

In use, GFCI 111 functions in the following manner. Prior to connection, switches SW61 and SW62 are in their first connective position as shown in FIG. 7.

Upon initial connection of GFCI 111 at one end to the load and at the other end to the power source, line voltage from the power source is disconnected from the load and rectifier SCR1 is turned off since no base current is applied to rectifier SCR1 from chip U1. At the same time, base current is applied to transistor Q1 from power supply 117 through resistors R63, R56 and R4, turning transistor Q1 on. Also, at the same time, 120 volts DC from power supply circuit 117 is supplied into solenoid SOL51, causing solenoid SOL51 to become energized and moving switches SW61 and SW62 into their second position (opposite the position shown in FIG. 7), thereby enabling power to be supplied into the load.

With solenoid SOL51 in its energized state and transistor Q1 on, solenoid SOL51 is kept in its energized state by 120 volts DC from power supply 117. Upon the detection of a ground fault or grounded neutral condition, fault detection circuit 119 sends a base current to rectifier SCR1 from pin 5 in chip U1 which turns on rectifier SCR1 and which, in turn, turns off transistor Q1. With transistor Q1 off, current does not pass through solenoid SOL51, causing solenoid SOL51 to become de-energized. Once de-energized, solenoid SOL51 causes switches SW61 and SW62 to return to their first connective position, thereby cutting off power from the power source to the load.

With switches SW61 and SW62 in their first connective position, line voltage passes into trip indicating circuit 127 which, in turn, causes light emitting diode LED61 to light up and flash, thereby indicating that circuit 111 has been tripped.

Once the fault condition is removed, circuit 111 can be reset by depressing reset switch SW4. Depression of switch SW4 turns off rectifier SCR1, which allows transistor Q1 to be turned on enabling solenoid SOL51 to become re-energized.

Figure 8:
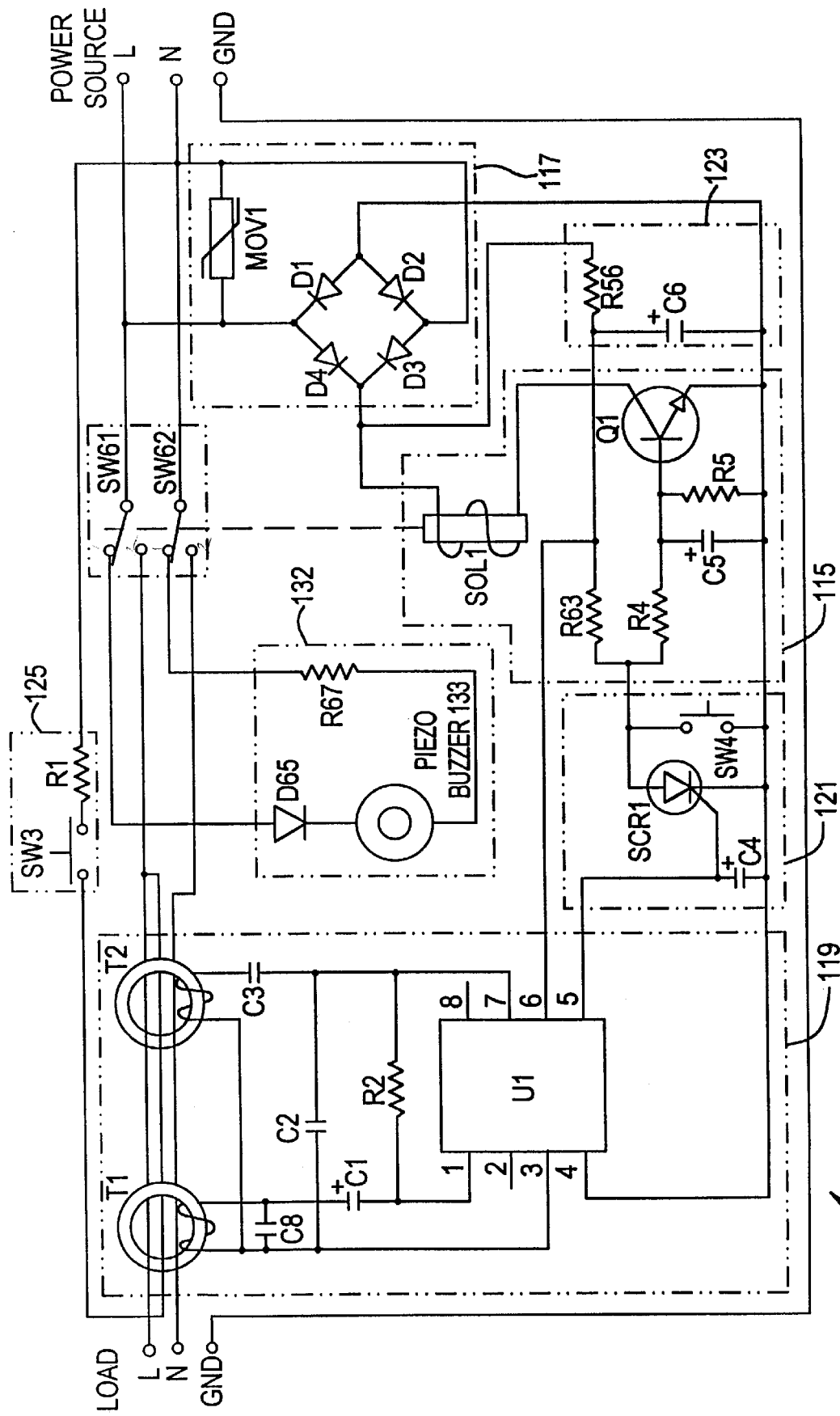
FIG. 8 is a schematic circuit diagram of another GFCI of the present invention.

FIG. 8 shows another ground fault circuit interrupter (GFCI) constructed according to the teachings of the present invention, the GFCI being represented generally by reference numeral 131.

GFCI 131 is identical to GFCI 111 except for the trip indicating circuit. In particular, instead of the trip indicating circuit containing an LED as in GFCI 111, trip indicating circuit 132 in GFCI 131 includes a piezo buzzer 133 for providing an audio signal indicating a fault rather than a visual signal.

The versions of the present invention described above are intended to be merely exemplary and those skilled in the art shall be able to make numerous variations and modifications to it without departing from the spirit of the present invention. All such variations and modifications are intended to be within the scope of the present invention as defined in the appended claims. For example, it should be noted that the particular components which make up the aforementioned embodiments may be interchanged or combined to form additional embodiments.

What is claimed is:

1. A ground fault circuit interrupter (GFCI) for interrupting the flow of current through a pair of lines extending between a source of power and a load, said GFCI comprising:

(a) a circuit breaker having a switch located in one of said lines, said switch having a first position in which the source of power in its associated line is not connected to the load and a second position in which the source of power in its associated line is connected to the load, (b) a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, said solenoid having a coil resistance of approximately 5,000 ohms, (c) a booster circuit for selectively supplying a first voltage to the solenoid sufficient to cause said solenoid to switch from its de-energized state to its energized state, said first voltage being supplied to said solenoid through said switch when said switch is in its first position, (d) a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, (e) a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state, and (f) a fault detecting circuit for detecting the presence of a fault condition in at least one of said lines extending between the power and the load and for causing said latch circuit to latch in its second bi-stable state upon detection of said fault condition.

2. The GFCI of claim 1 wherein said relay circuit further includes means coupled to said solenoid for selectively controlling the operation of said solenoid.

3. The GFCI of claim 2 wherein said means for selectively controlling the operation of said solenoid is a transistor.

4. The GFCI of claim 1 wherein the switch in said circuit breaker is normally in said first position.

5. The GFCI of claim 1 wherein said booster circuit allows said relay circuit to automatically move said switch to its second position upon application of power to said lines.

6. The GFCI of claim 1 wherein the first voltage is approximately 120 volts and the second voltage is approximately 28 volts, said power supply circuit including a limiting resistor for lowering the first voltage to produce the second voltage.

7. The GFCI of claim 1 further including a reset switch for manually resetting said latch circuit into said first bi-stable state after it has been placed in said second bi-stable state by said fault detecting circuit.

8. The GFCI of claim 7 wherein said latch circuit comprises a silicon controlled rectifier which is non-conducting when said latch circuit is in its first state and is conducting when said electronic latch circuit is in its second state, said fault detecting circuit causing said rectifier to turn on when said fault detecting circuit detects said fault condition.

9. The GFCI of claim 8 wherein the depression of said reset switch resets said latch circuit by shorting out said silicon controlled rectifier.

10. The GFCI of claim 8 wherein the depression of said reset switch resets said latch circuit without shorting out said silicon controlled rectifier.

11. A ground fault circuit interrupter (GFCI) for interrupting the flow of current through a pair of lines extending between a source of power and a load, said GFCI comprising:

(a) a circuit breaker having a switch located in one of said lines, said switch having a first position in which the source of power in its associated line is not connected to the load and a second position in which the source of power in its associated line is connected to the load, (b) a relay circuit for selectively moving and maintaining said switch in either said first position or said second position, said relay circuit including a solenoid operable in either an energized state or a de-energized state and means coupled to said solenoid for controlling the state of said solenoid, said solenoid setting said switch in said second position when in its energized state and setting said switch in said first position when in its de-energized state, said solenoid having a coil resistance of approximately 5,000 ohms, (c) a booster circuit for selectively supplying a first voltage to the solenoid sufficient to cause said solenoid to switch from its de-energized state to its energized state, said first voltage being supplied to said solenoid through said switch when said switch is in its first position, (d) a power supply circuit, said power supply circuit supplying a second voltage to the solenoid, said second voltage being sufficient to maintain the solenoid in its energized state after being initially energized by the first voltage, the second voltage being less than the first voltage, the second voltage being insufficient to switch said solenoid from its de-energized state to its energized state, and (e) a fault detecting circuit for detecting the presence of a fault condition in at least one of said lines extending between the power and the load and for causing said means coupled to said solenoid to switch said solenoid from its energized state to its de-energized state and remain in its de-energized state upon detection of said fault condition.

12. The GFCI of claim 11 further comprising a trip indicating circuit for visually indicating that said fault detecting circuit has detected a fault condition.

13. The GFCI of claim 11 wherein the switch in said circuit breaker is normally in said first position.

14. The GFCI of claim 13 wherein said booster circuit includes a reset button, wherein upon initial application of power to said lines, said GFCI requires the manual depression of said reset button in order for said booster circuit to cause said relay circuit to initially close said switch.

15. A ground fault circuit interrupter (GFCI) for interrupting the flow of current through a pair of lines extending between a source of power and a load, said GFCI comprising:

(a) a circuit breaker having a single-pole, double-throw switch located in one of said lines, said switch having a first position in which the source of power in its associated line is not connected to the load and a second position in which the source of power in its associated line is connected to the load, (b) a relay circuit for selectively moving and maintaining said switch in either said first position or said second position, said relay circuit including a solenoid operable in either an energized state or a de-energized state, said solenoid setting said switch in said second position when in its energized state and setting said switch in said first position when in its de-energized state, said solenoid having a coil resistance of approximately 8,000 ohms, (c) a power supply circuit for supplying power to said GFCI, (d) a latch circuit operable in first and second bi-stable states, said latch circuit allowing said solenoid to switch from its de-energized state to its energized state and remain in its energized state when in said first bi-stable state and said latch circuit causing said solenoid to switch from its energized state to its de-energized state and remain in its de-energized state when in said second bi-stable state, (e) a fault detecting circuit for detecting the presence of a fault condition in at least one of said lines extending between the power and the load and for causing said latch circuit to latch in its second bi-stable state upon detection of said fault condition, and (f) a trip indicating circuit coupled to the first position of said switch for indicating that said fault detecting circuit has detected a fault condition.

16. The GFCI of claim 15 wherein said trip indicating circuit acoustically indicates that said fault detecting circuit has detected a fault condition.

17. The GFCI of claim 15 wherein said trip indicating circuit visually indicates that said fault detecting circuit has detected a fault condition.

* * * * *